US012585008B1

(12) United States Patent
Aldana et al.

(10) Patent No.: US 12,585,008 B1
(45) Date of Patent: Mar. 24, 2026

(54) SYSTEMS AND METHODS FOR OUT-OF-BAND ASSISTED UWB SENSING

(71) Applicant: Meta Platforms Technologies, LLC, Menlo Park, CA (US)

(72) Inventors: Carlos Horacio Aldana, Mountain View, CA (US); Claudio Rafael Cunha Monteiro da Silva, Portland, OR (US); Chunyu Hu, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 523 days.

(21) Appl. No.: 18/080,015

(22) Filed: Dec. 13, 2022

Related U.S. Application Data

(60) Provisional application No. 63/319,877, filed on Mar. 15, 2022.

(51) Int. Cl.
G01S 13/46 (2006.01)
G01S 5/02 (2010.01)
H04W 24/10 (2009.01)

(52) U.S. Cl.
CPC ............ G01S 13/46 (2013.01); G01S 5/0284 (2013.01); *H04W 24/10* (2013.01)

(58) Field of Classification Search
CPC ....... G01S 13/46; G01S 5/0284; H04W 24/10
See application file for complete search history.

(56) References Cited

U.S. PATENT DOCUMENTS

| | | | | |
|---|---|---|---|---|
| 11,564,057 | B2 * | 1/2023 | Barton | ................... H04W 72/56 |
| 11,644,525 | B2 * | 5/2023 | Silverman | ............. G01S 5/0249 |
| | | | | 455/456.1 |
| 11,828,832 | B2 * | 11/2023 | Henry | ..................... H04W 4/80 |
| 2008/0186231 | A1 * | 8/2008 | Aljadeff | ................... G01S 5/06 |
| | | | | 342/387 |
| 2020/0319324 | A1 * | 10/2020 | Au | ......................... H04W 48/16 |
| 2023/0064143 | A1 * | 3/2023 | Aldana | ............... G01S 13/0209 |
| 2023/0170933 | A1 * | 6/2023 | Lee | ........................ G01S 13/765 |
| | | | | 375/130 |
| 2024/0019525 | A1 * | 1/2024 | Thomas | ................ H04W 64/00 |
| 2024/0098677 | A1 * | 3/2024 | Takeda | .................. G01S 13/765 |

* cited by examiner

*Primary Examiner* — Siu M Lee
(74) *Attorney, Agent, or Firm* — Foley & Lardner LLP

(57) ABSTRACT

A first device includes an ultra-wideband (UWB) antenna, a non-UWB communication device, and one or more processors. The one or more processors may be configured to detect a UWB signal received from a second device via the UWB antenna. The one or more processors may be configured to generate a measurement report corresponding to the UWB signal. The one or more processors may be configured to transmit, via a transmitter, the measurement report to the second device via the non-UWB communication device.

11 Claims, 9 Drawing Sheets

150

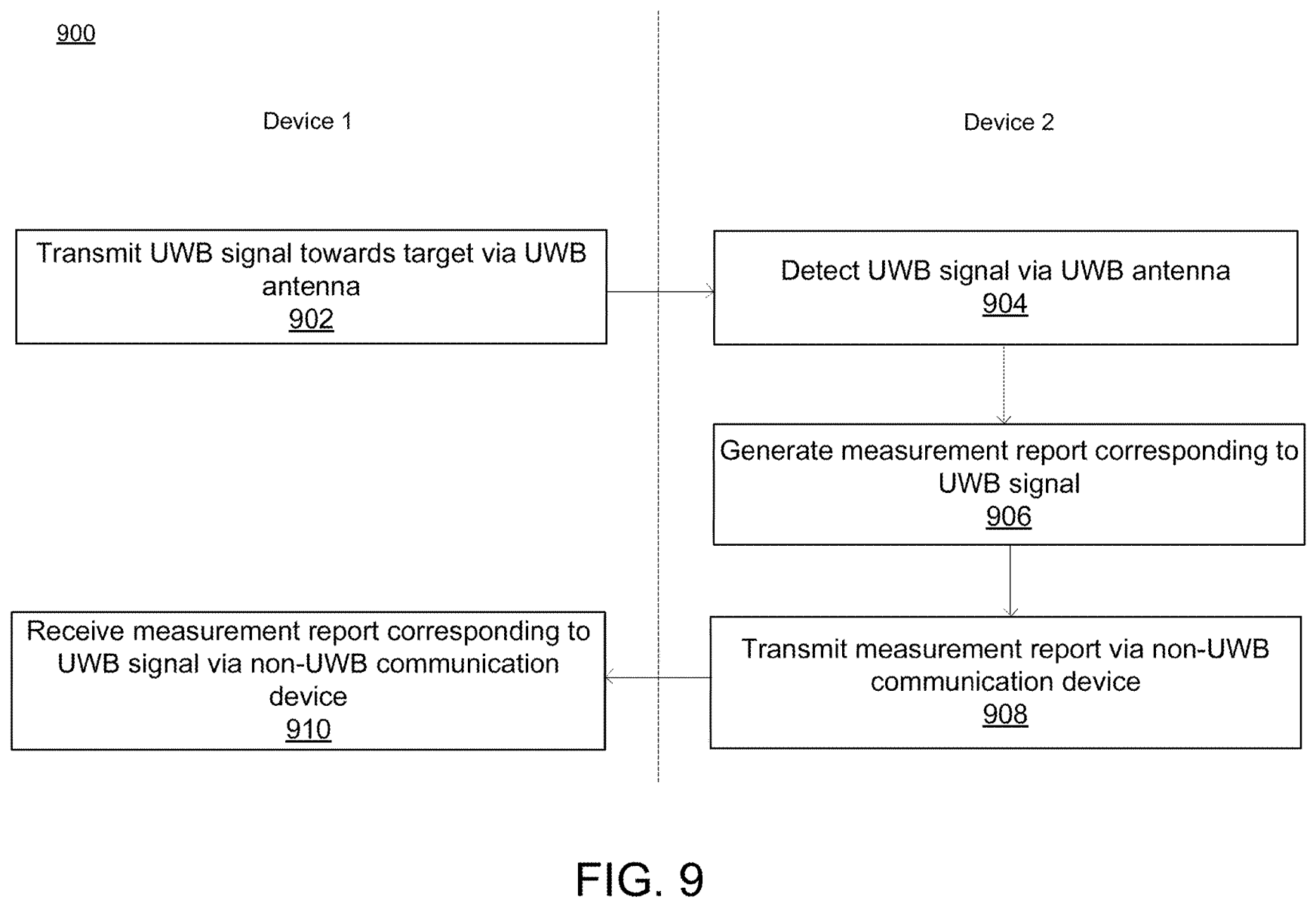

900

Device 1

Transmit UWB signal towards target via UWB antenna
902

Receive measurement report corresponding to UWB signal via non-UWB communication device
910

Device 2

Detect UWB signal via UWB antenna
904

Generate measurement report corresponding to UWB signal
906

Transmit measurement report via non-UWB communication device
908

FIG. 9

SYSTEMS AND METHODS FOR OUT-OF-BAND ASSISTED UWB SENSING

CROSS-REFERENCE TO RELATED APPLICATIONS

This application claims the benefit of and priority to U.S. Application No. 63/319,877, filed Mar. 15, 2022, the contents of which are incorporated by reference in their entirety for all purposes.

FIELD OF DISCLOSURE

The present disclosure is generally related to ultra-wideband devices including, but not limited to, systems and methods for out-of-band assisted UWB sensing.

BACKGROUND

Ultra-wideband devices may precisely determine the position and/or movement of objects in an environment by transmitting and receiving ultra-wideband signals within a specific amount of time. While transmitting and receiving ultra-wideband signals enables fine sensing, the data transfer rates supported by ultra-wideband signals may be relatively low. Such low data rates may limit the rate and size of data exchanges between ultra-wideband devices.

SUMMARY

At least one aspect disclosed herein is related to a method. The method may include detecting, by a first device, an ultra-wideband (UWB) signal received from a second device via a UWB antenna of the first device. The method may include generating, by the first device, a measurement report corresponding to the UWB signal. The method may include transmitting, by the first device, the measurement report to the second device via a non-UWB communication.

In some embodiments, the UWB signal includes a physical layer protocol data unit (PPDU) transmitted by the second device and reflected off a target.

In some embodiments, the method may include configuring, by the first device with the second device, to use a non-UWB communication link for sending measurement reports corresponding to UWB signals between the first device and the second device.

In some embodiments, the method may include communicating measurement data corresponding to the UWB signal, from a physical layer of the first device to an application of the first device. In some embodiments, the application generates the measurement report using the measurement data from the physical layer. In some embodiments, the measurement data is communicated from the physical layer via a medium access control (MAC) layer management entity (MLME) to the application. In some embodiments, the MLME is a first interface. The method may include communicating the measurement report from the application via a second interface to the non-UWB communication device for transmission to the second device.

In some embodiments, the non-UWB communication device transmits the measurement report via a protocol including at least one of a wireless local area network (WLAN) protocol, cellular protocol, Bluetooth wireless protocol, or non-wireless protocol.

In some embodiments, the method may include configuring, by the first device with the second device, a formatting for sending the measurement reports corresponding to the UWB signals between the first device and the second device.

At least one aspect disclosed herein is related to a method. The method may include transmitting, by a first device, an ultra-wideband (UWB signal) towards a target via a UWB antenna of the first device. The method may include receiving, by the first device from a second device, a measurement report corresponding to the UWB signal via a non-UWB communication device of the first device, the second device generating the measurement report based on the UWB signal received by the second device reflected off the target.

In some embodiments, the method may include configuring, by the first device with the second device, to use a non-UWB communication link for sending measurement reports corresponding to UWB signals between the first device and the second device.

In some embodiments, the non-UWB communication device receives the measurement report via a protocol including at least one of a wireless local area network (WLAN) protocol, cellular protocol, Bluetooth wireless protocol, or non-wireless protocol.

At least one aspect disclosed herein is related to a first device. The first device may include a non-UWB communication device, an ultra-wideband (UWB) antenna, and one or more processors. The one or more processors may be configured to detect a UWB signal received from a second device via the UWB antenna. The one or more processors may be configured to generate a measurement report corresponding to the UWB signal. The one or more processors may be configured to transmit the measurement report to the second device via the non-UWB communication device.

In some embodiments, the UWB signal includes a physical layer protocol data unit (PPDU) transmitted by the second device and reflected off a target.

In some embodiments, the UWB antenna is configured to communicate measurement data corresponding to the UWB signal, from a physical layer of the UWB antenna to an application of the first device. In some embodiments, the application is configured to generate the measurement report using the measurement data from the physical layer. In some embodiments, the measurement data is communicated from the physical layer via a medium access control (MAC) layer management entity (MLME) to the application. In some embodiments, the MLME is a first interface. The application may be configured to communicate the measurement report via a second interface to the non-UWB communication device for transmission to the second device.

In some embodiments, the non-UWB communication device transmits the measurement report via a protocol including at least one of a wireless local area network (WLAN) protocol, cellular protocol, Bluetooth wireless protocol, or non-wireless protocol.

In some embodiments, the one or more processors are configured to configure, with the second device, to use a non-UWB communication link for sending measurement reports corresponding to UWB signals between the first device and the second device.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 9 is a flowchart showing a method of out-of-band assisted UWB sensing, according to an example implementation of the present disclosure.

DETAILED DESCRIPTION

Figure 1:
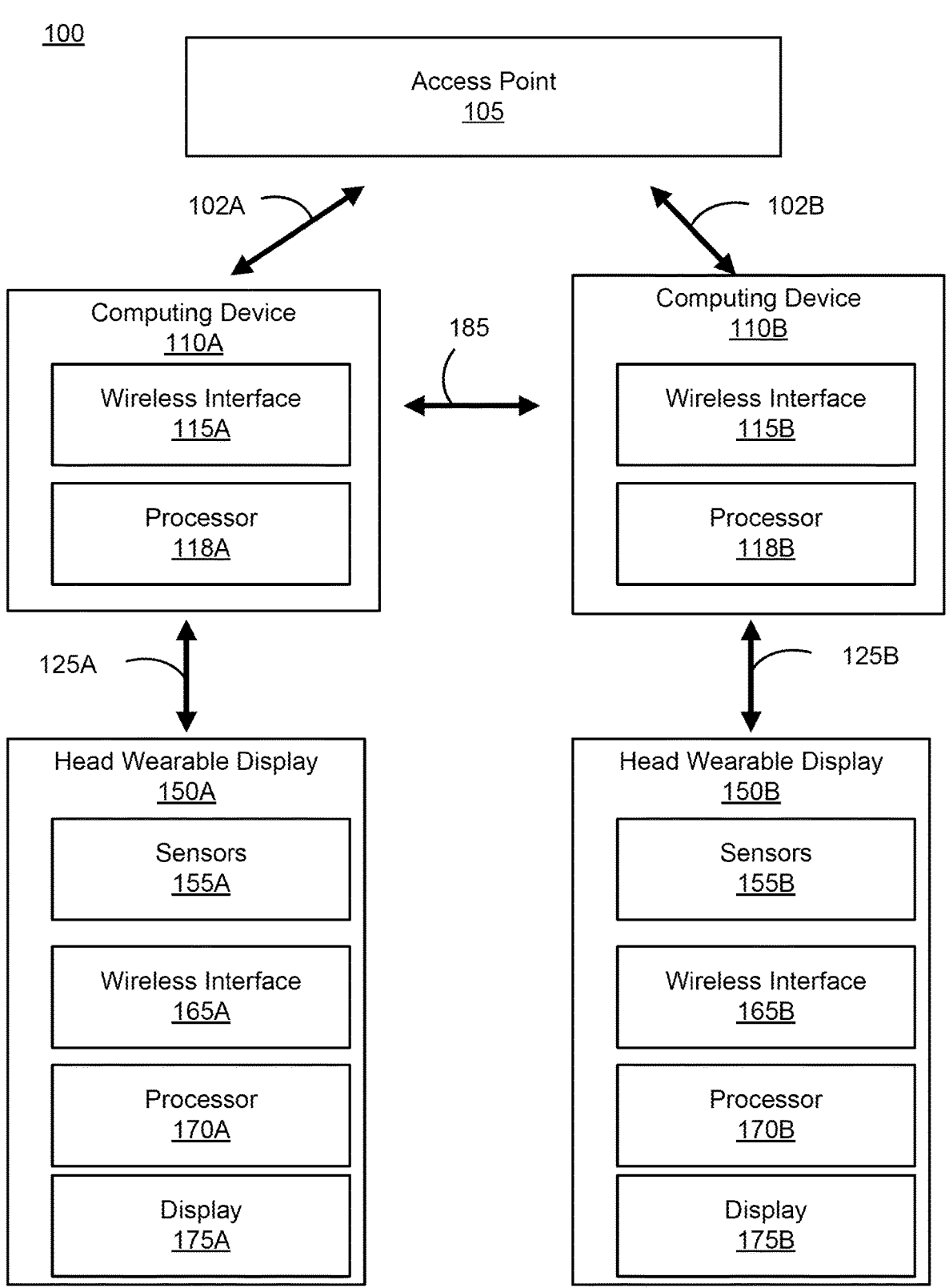
FIG. 1 is a diagram of a system environment including an artificial reality system, according to an example implementation of the present disclosure.
Figure 2:
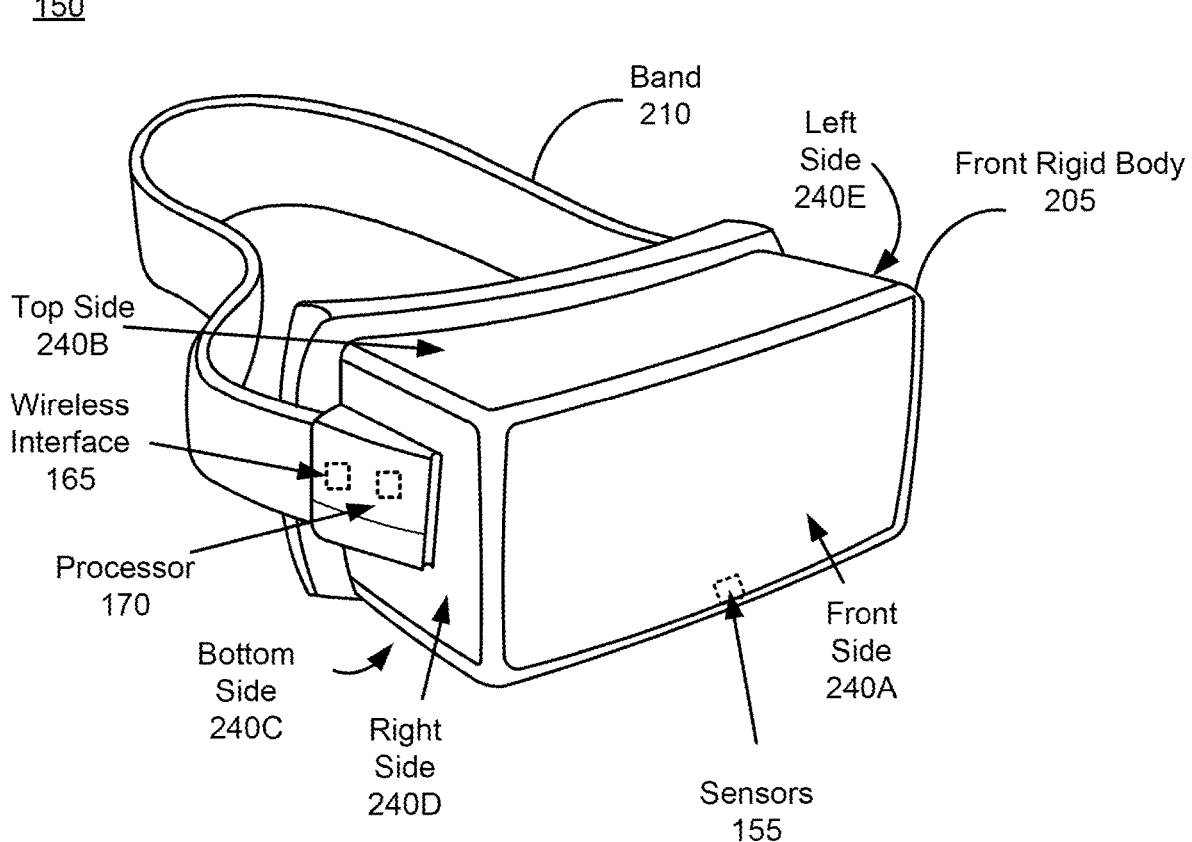
FIG. 2 is a diagram of a head wearable display, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to devices operating in the ultra-wideband (UWB) spectrum and, more particularly, to UWB devices communicating with other UWB devices within an environment by transmitting and/or receiving signals reflected off a target. In various embodiments, a first UWB device may generate a request for a measurement report that includes information about the position of a target. For example, the first UWB device may transmit a UWB signal via a UWB communication device (e.g., antenna) towards a target to be reflected off the target. A second UWB device may detect/receive the reflected signal via a UWB communication device. The second UWB device may process the reflected signal and can generate a measurement report indicating information about a position of the target. The UWB sensing may enable fine range resolution to determine the movement and/or position of the target. The second UWB device may transmit the measurement report back to the first UWB device. However, the UWB communication devices may include a low data transfer rate (e.g., about equal to or less than 30 Mbps), which may limit the overall efficiency of transfer between the UWB communication devices, especially if the measurement report is large in size. According to the embodiments described herein, the systems and methods described herein may generate the measurement report using UWB signals and can transmit the generated measurement report via a non-UWB communication link to increase efficiency of data transfer while maintaining the resolution of the UWB measurements.

The systems and methods described herein may transmit one or more UWB signals from a UWB communication device of a first device towards a target. The systems and methods described herein may detect one or more UWB signals reflected off the target via a UWB communication device of a second device. The systems and methods described herein may process the detected UWB signals and may generate a measurement report corresponding to the UWB signals. The systems and methods described herein may transmit the measurement report from a non-UWB communication device of the second device to a non-UWB communication device of the first device. By receiving measurement data via a UWB communication link, the systems and methods described herein may determine information about movement and/or a position of the target. By transmitting the measurement report via a non-UWB communication link, the systems and methods described herein may transfer the measurement report efficiently at a high data transfer speed (e.g., above 30 Mbps). Accordingly, the systems and methods described herein may facilitate determining information about a position of a target with greater accuracy and speed than conventional techniques. Various applications, use cases, and further implementations of the systems and methods described herein are described in greater detail below.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Systems and Methods for Ultra-Wideband Devices

In various embodiments, the devices in the environments described above may operate or otherwise use components which leverage communications in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some systems may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices located in the environment) for very low data rates (e.g., 10s to 100s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Figure 3:
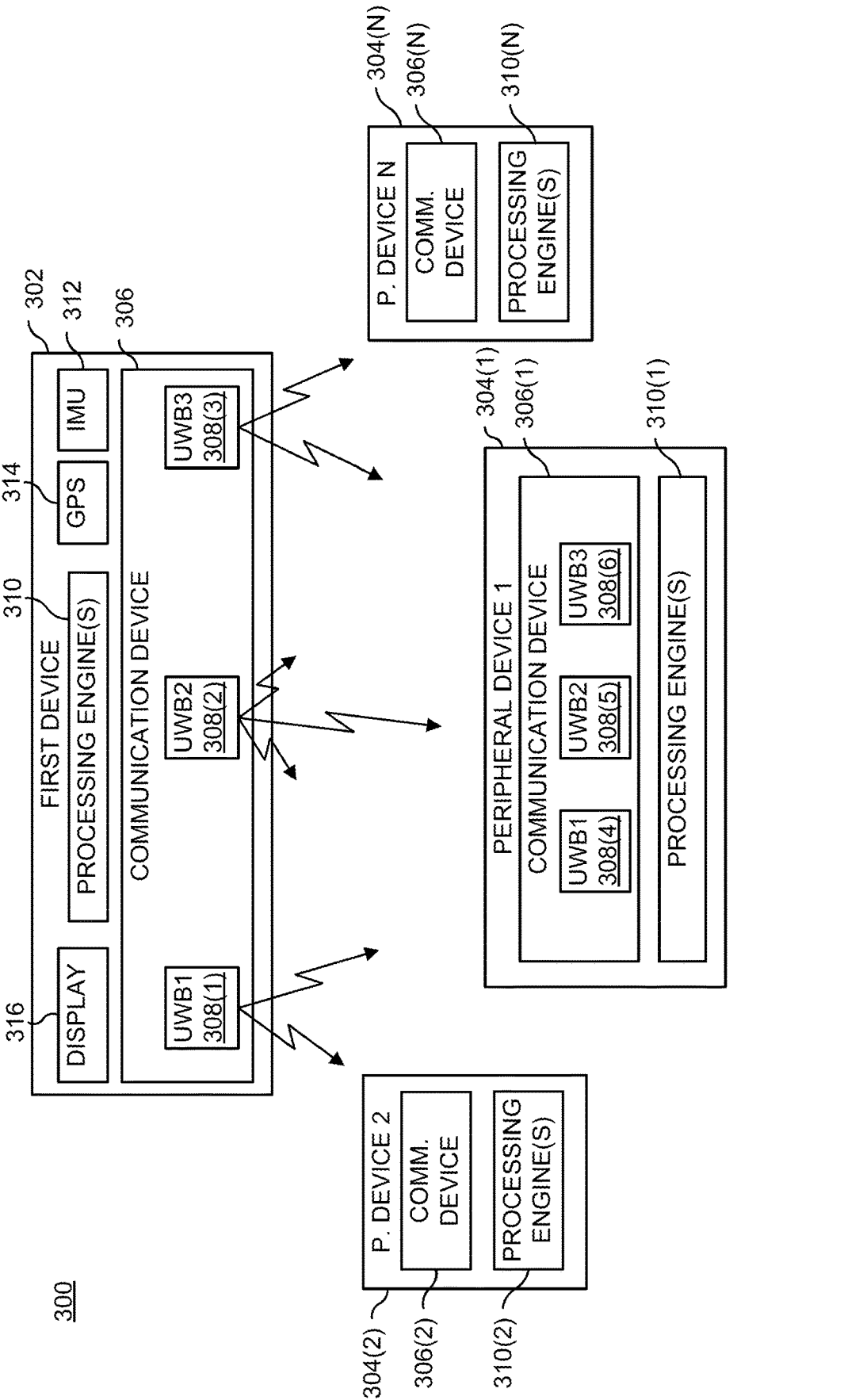
FIG. 3 is a block diagram of an artificial reality environment, according to an example implementation of the present disclosure.

Some implementations of UWB may focus on precision ranging, security, and for low-to-moderate rate data communication. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions Referring now to FIG. 3, depicted is a block diagram of an artificial reality environment 300. The artificial reality environment 300 is shown to include a first device 302 and one or more peripheral devices 304(1)-304 (N) (also referred to as "peripheral device 304" or "device 304"). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHz) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, console device, or other computing device). The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, etc.), an automobile or other vehicle, a beacon transmitting device located in the environment 300, a smart home device (e.g., a smart television, a digital assistant device, a smart speaker, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between) the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

Figure 4:
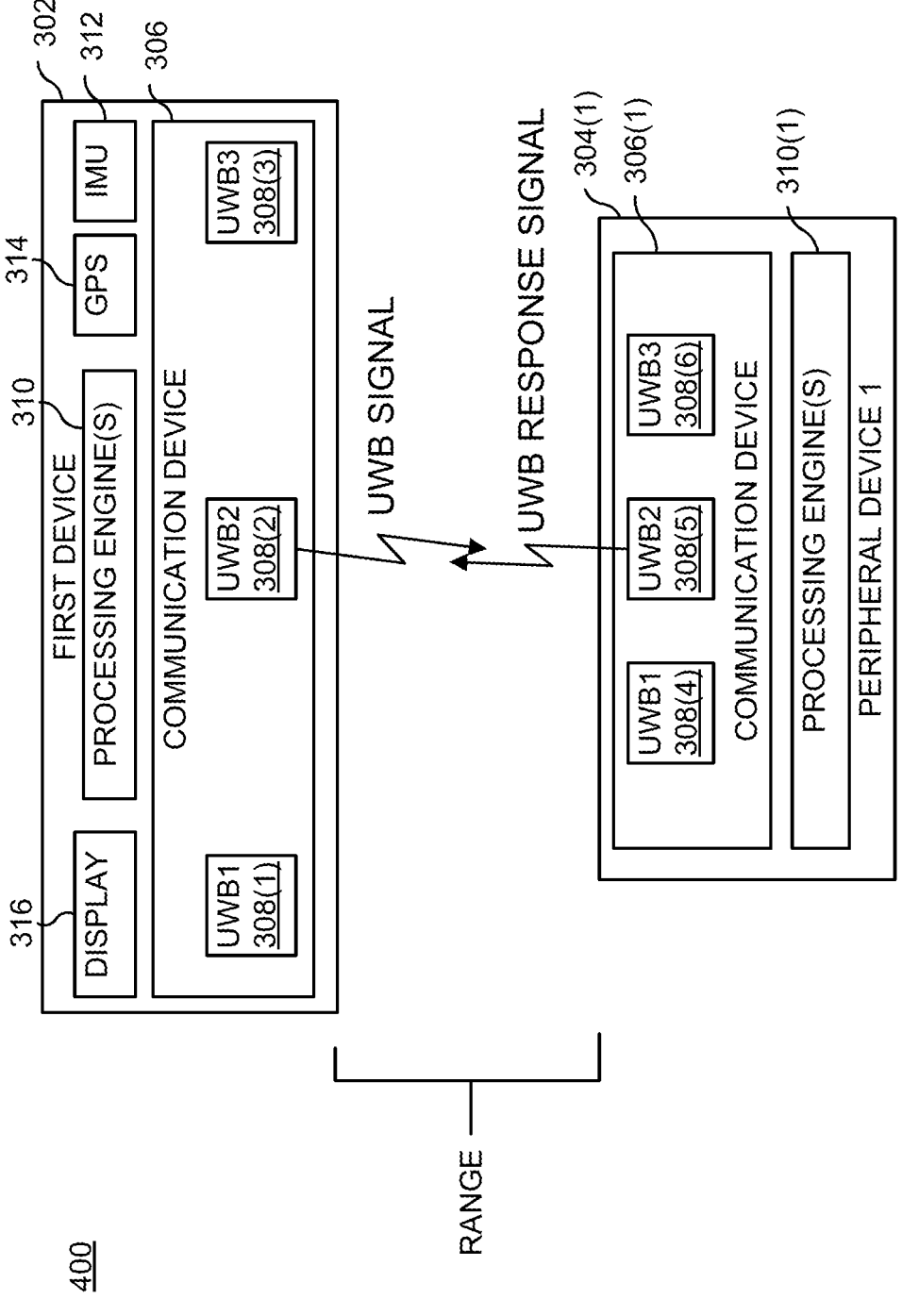
FIG. 4 is a block diagram of another artificial reality environment, according to an example implementation of the present disclosure.

Referring now to FIG. 4, depicted is a block diagram of an environment 400 including the first device 302 and a peripheral device 304. The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHz). As such, the UWB device 308 may be configured to transmit the UWB signal in the UWB spectrum (e.g., between 3.1 GHz and 10.6 GHz) and having a high bandwidth (e.g., 500 MHZ). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 and/or the peripheral device 304 may be configured to determine the TOF based on timestamps corresponding to the UWB signal. For example, the first device 302 and/or peripheral device 304 may be configured to exchange transmit and receive timestamps based on when the first device 302 transmits the UWB signal (a first TX timestamp), when the peripheral device receives the UWB signal (e.g., a first RX timestamp), when the peripheral device sends the UWB response signal (e.g., a second TX timestamp), and when the first device 302 receives the UWB response signal (e.g., a second RX timestamp). The first device 302 and/or the peripheral device 304 may be configured to determine the TOF based on a first time in which the first device 302 sent the UWB signal and a second time in which the first device 302 received the UWB response signal (e.g., from the peripheral device 304), as indicated by first and second TX and RX timestamps identified above. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF.

For example, the first device 302 may be configured to compute the range or distance between the first device 302 and the peripheral device 304 by multiplying the TOF and the speed of light (e.g., TOF×c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above.

Figure 5:
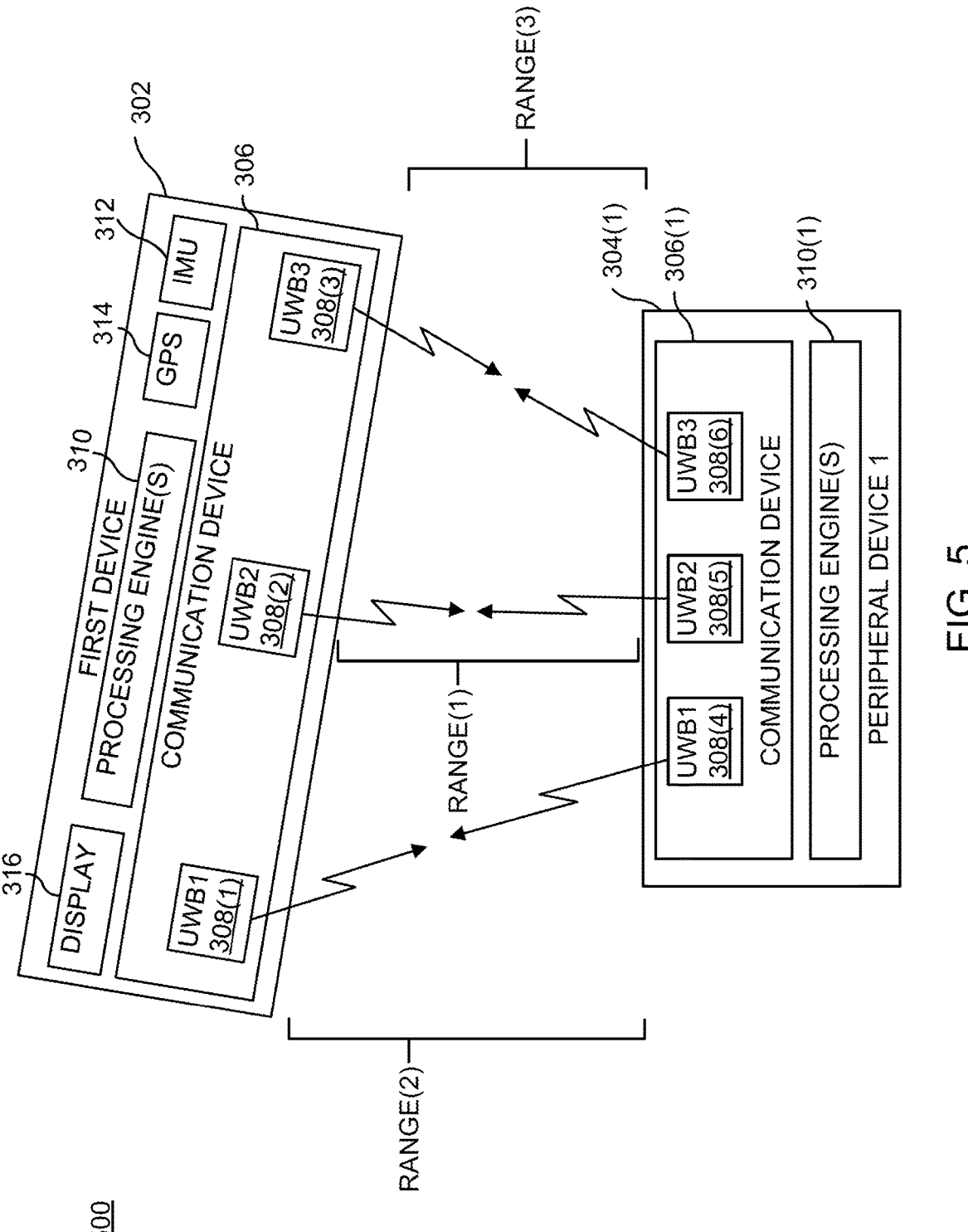
FIG. 5 is a block diagram of another artificial reality environment, according to an example implementation of the present disclosure.

Referring now to FIG. 5, depicted is a block diagram of an environment 500 including the first device 302 and a peripheral device 304. In some embodiments, the first device 302 and/or the peripheral device 304 may be configured to determine a position or pose (e.g., orientation) of the first device 302 relative to the peripheral device 304. The first device 302 and/or the peripheral device 304 may be configured to determine the relative position or orientation in a manner similar to determining the range as described above. For example, the first device 302 and/or the peripheral device 304 may be configured to determine a plurality of ranges (e.g., range(1), range(2), and range(3)) between the respective UWB devices 308 of the first device 302 and the peripheral device 304. In the environment 500 of FIG. 5, the first device 302 is positioned or oriented at an angle relative to the peripheral device 304. The first device 302 may be configured to compute the first range (range(1)) between central UWB devices 308(2), 308(5) of the first and peripheral device 304. The first range may be an absolute range or distance between the devices 302, 304, and may be computed as described above with respect to FIG. 4.

The first device 302 and/or the peripheral device 304 may be configured to compute the second range(2) and third range(3) similar to computing the range(1), In some embodiments, the first device 302 and/or the peripheral device 304 may be configured to determine additional ranges, such as a range between UWB device 308(1) of the first device 302 and UWB device 308(5) of the peripheral device 304, a range between UWB device 308(2) of the first device 302 and UWB device 308(6) of the peripheral device 304, and so forth. While described above as determining a range based on additional UWB signals, it is noted that, in some embodiments, the first device 302 and/or the peripheral device 304 may be configured to determine a phase difference between a UWB signal received at a first UWB device 308 and a second UWB device 308 (i.e., the same UWB signal received at separate UWB devices 308 on the same device 302, 304). The first device 302 and/or the peripheral device 304 may be configured to use each or a subset of the computed ranges (or phase differences) to determine the pose, position, orientation, etc. of the first device 302 relative to the peripheral device 304. For example, the first device and/or the peripheral device 304 may be configured to use one of the ranges relative to the first range(1) (or phase differences) to determine a yaw of the first device 302 relative to the peripheral device 304, another one of the ranges relative to the first range(1) (or phase differences) to determine a pitch of the first device 302 relative to the peripheral device 304, another one of the ranges relative to the first range(1) (or phase differences) to determine a roll of the first device 302 relative to the peripheral device 304, and so forth.

By using the UWB devices 308 at the first device 302 and peripheral devices 304, the range and pose may be determined with greater accuracy than other ranging/wireless link technologies. For example, the range may be determined within a granularity or range of +/−0.1 meters, and the pose/orientation may be determined within a granularity or range of +/−5 degrees.

Referring to FIG. 3-FIG. 5, in some embodiments, the first device 302 may include various sensors and/or sensing systems. For example, the first device 302 may include an inertial measurement unit (IMU) sensor 312, global positioning system (GPS) 314, etc. The sensors and/or sensing systems, such as the IMU sensor 312 and/or GPS 314 may be configured to generate data corresponding to the first device 302. For example, the IMU sensor 312 may be configured to generate data corresponding to an absolute position and/or pose of the first device 302. Similarly, the GPS 314 may be configured to generate data corresponding to an absolute location/position of the first device 302. The data from the IMU sensor 312 and/or GPS 314 may be used in conjunction with the ranging/position data determined via the UWB devices 308 as described above. In some embodiments, the first device 302 may include a display 316. The display 316 may be integrated or otherwise incorporated in the first device 302. In some embodiments, the display 316 may be separate or remote from the first device 302. The display 316 may be configured to display, render, or otherwise provide visual information to a user or wearer of the first device 302, which may be rendered at least in part on the ranging/position data of the first device 302.

One or more of the devices 302, 304 may include various processing engine(s) 310. As noted above, the processing engine(s) 310 may be or include any device, component, machine, or combination of hardware and software designed or implemented to control the devices 302, 304 based on UWB signals transmitted and/or received by the respective UWB devices 308. In some embodiments, the processing engine(s) 310 may be configured to compute or otherwise determine the ranges/positions of the first device 302 relative to the peripheral devices 304 as described above. In some embodiments, the processing engines 310 may be located or embodied on another device in the environment 300-500 (such as at the access point 105 as described above with respect to FIG. 1). As such, the first device 302 and/or peripheral devices 304 may be configured to off-load computation to another device in the environment 300-500 (such as the access point 105). In some embodiments, the processing engines 310 may be configured to perform various functions and computations relating to radio transmissions and scheduling (e.g., via the UWB devices 308 and/or other communication interface components), compute or otherwise determine range and relative position of the devices 302, 304, manage data exchanged between the devices 302, 304, interface with external components (such as hardware components in the environment 300-500, external software or applications, etc.), and the like. Various examples of functions and computations which may be performed by the processing engine(s) 310 are described in greater detail below.

Figure 6:
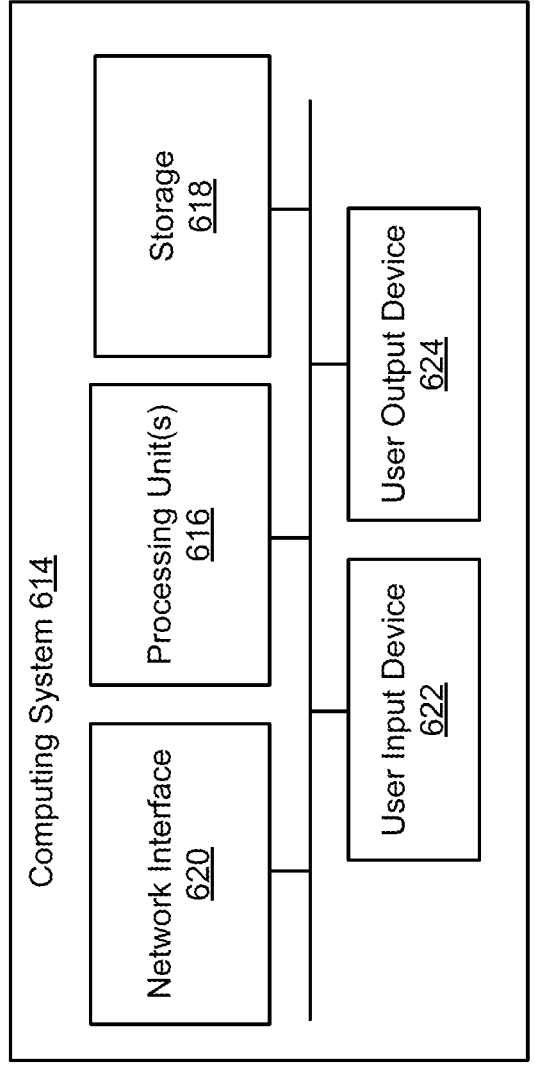
FIG. 6 is a block diagram of a computing environment according to an example implementation of the present disclosure.

Various operations described herein can be implemented on computer systems. FIG. 6 shows a block diagram of a representative computing system 614 usable to implement the present disclosure. In some embodiments, the computing device 110, the HWD 150, devices 302, 304, or each of the components of FIG. 1-5 are implemented by or may otherwise include one or more components of the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Systems and Methods for Out-of-Band Assisted UWB Sensing

Transmitting and receiving UWB signals between UWB devices may provide highly accurate sensing data that includes information about a position of the UWB devices and/or a position of objects near the UWB devices. However, data transfer between such UWB devices on a UWB channel or link may be limited or constrained, due to a low data transfer rate of transmitting UWB signals using the UWB protocol. For example, the low data transfer rate between UWB antennas of the UWB devices may inhibit and/or prevent accurate and/or detailed data from being effectively and efficiently transferred. Therefore, transferring highly accurate UWB data between UWB devices using a non-UWB communication link may significantly improve efficiency and effectiveness of transmitting such data between the devices.

As described herein, one or more UWB devices within an environment may request sensing data regarding a target in the environment. To sense the target with a fine resolution, the UWB devices may request and/or obtain sensing data using UWB signals. For example, a first UWB device may request a measurement report that includes information about a position and/or movement of the target. The first UWB device may transmit a UWB signal via a UWB communication device (e.g., antenna) towards the target to be reflected off the target. A second UWB device may detect the reflected signal via a UWB communication device, may process the reflected signal, and can generate a measurement report that includes information about a position of the target and/or movement of the target. The second UWB device may transmit the measurement report back to the first UWB device. However, the UWB communication link between the first and second device may have a low data transfer rate, which may limit the overall efficiency of transferring the measurement report between the devices. Accordingly, and in various embodiments described herein, the second UWB device may generate the measurement report using UWB signals, and may transmit the generated measurement report via a non-UWB communication link or channel (e.g., an out-of-band [OOB] communication link) to increase efficiency of data transfer while maintaining the resolution of the UWB measurements.

Figure 7:
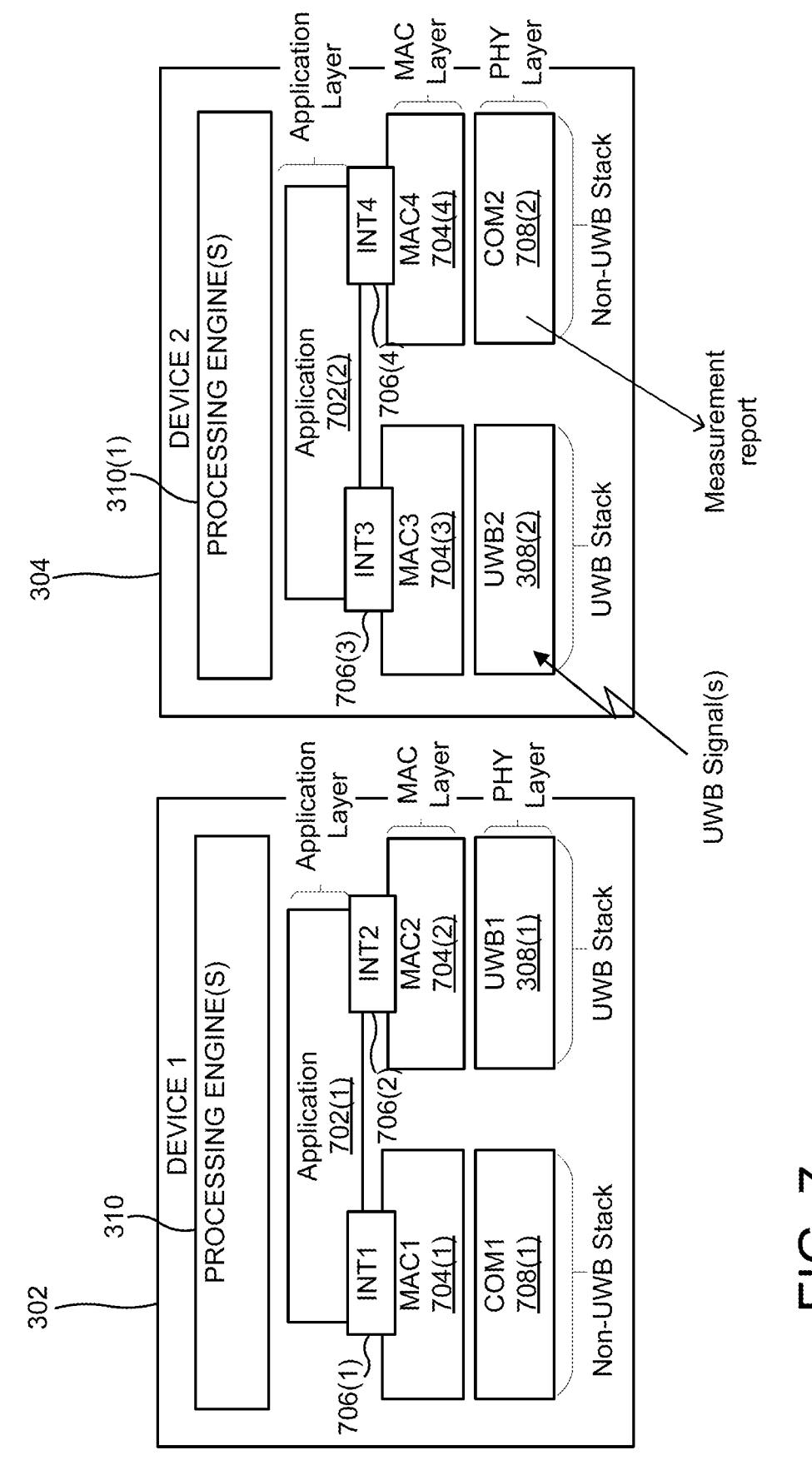
FIG. 7 is a block diagram of UWB devices within an environment, according to an example implementation of the present disclosure.

FIG. 7 is a block diagram of an environment 700 including a first device 302 and a second device 304, according to an example implementation of the present disclosure. The first device 302 may include one or more ultra-wideband (UWB) antennas (e.g., UWB antenna 308(1)) and one or more processors (e.g., processing unit 616 in FIG. 6). The second device 304 may include one or more ultra-wideband (UWB) antennas (e.g., UWB antenna 308(2)) and one or more processors (e.g., processing unit 616 in FIG. 6). As described herein, the first device 302 and/or the second device 304 may be various types of UWB devices including a wearable device, such as the HWD 150 described herein, a smart watch, AR glasses, or the like. In some embodiments, the first device 302 and/or the second device 304 may include a mobile device (e.g., a smart phone, tablet, console device, or other computing device). In some embodiments, the first device 302 and/or the second device 304 may be or may include an automobile or other vehicle, a beacon transmitting device located in the environment 700, a smart home device (e.g., a smart television, a digital assistant device, a smart speaker, etc.), a smart tag configured for positioning on various devices, or other various devices. The first device 302 and/or the second device 304 may have a configuration similar to the device 302 and/or the peripheral devices 304 in FIG. 3 through FIG. 5.

As described herein, the first device 302 and the second device 304 may be configured to communicably couple with one another in various ways. For example, the first device 302 may be configured to establish a connection with the second device 304 by detecting, monitoring, and/or identifying the second device 304 located in the environment 700. In some embodiments, for example, the first device 302 may be configured to use UWB signals received from the second device 304 within a certain distance of the first device 302 to detect, monitor, and/or identify the second device 304. The first device 302 and/or the second device 304 may be configured to identify that the other device is connected to a shared Wi-Fi network, as another example. The first device 302 and/or the second device 304 may be configured to pair with the other device following a pairing or handshaking process. For example, the first device 302 and/or the second device 304 may be configured to exchange handshake packet(s) with the other device, to pair the first device 302 and the second device 304. In some embodiments, the first device 302 and the second device 304 may be configured to communicably couple with one another by one or more wired or physical connections. For example, the first device 302 and the second device 304 may each be connected to a common device (e.g., AR glasses) and/or connected by one or more wires. In these and in other embodiments, the first device 302 and the second device 304 may be configured to transmit, receive, exchange, or otherwise communicate UWB and/or non-UWB data and/or signals to one another.

The first device 302 and/or the second device 304 may include various devices or components which are grouped according to one or more stacks. For example, the first device 302 and the second device 304 may each include a UWB stack and a non-UWB stack. Each stack may include layers defined according to one or more layers of the Open Systems Interconnection (OSI) model. For example, each of the UWB stacks may include a medium access control (MAC) layer (e.g., MAC layers 704(2) and 704(3)) and a physical (PHY) layer (e.g., UWB antennas 308(1) and 308(2)). Each of the non-UWB stacks may include a MAC layer (e.g., MAC layers 704(1) and 704(4)) and a physical layer (e.g., non-UWB communication devices 708(1) and 708(2)). As described herein, the non-UWB communication devices 708(1) and 708(2) may be or may include one or more wired or wireless communication devices configured to form a non-UWB and/or out-of-band (OOB) communication link between the first device 302 and the second device 304. The non-UWB communication devices may include, but are not limited to, a non-UWB antenna and/or radio (e.g., corresponding to communications sent via a Wi-Fi protocol, a wireless local area network (WLAN) protocol, a cellular protocol, an internet protocol, a ZigBee protocol, a Doppler protocol, or a Bluetooth™ protocol) and/or one or more wired lines (e.g., USB, Ethernet, Thunderbolt, co-axial, etc.). The MAC layer may include a layer within the non-UWB or UWB stack which may be configured to control hardware (e.g., the physical layer) responsible for interaction with a wired, optical, or wireless transmission medium. For example, the MAC layer may be configured to send and receive radio frequency frames via the physical layer, as described herein.

Each of the UWB and non-UWB stacks may include an application layer. For example, each of the UWB and non-UWB stacks may be configured to transmit data to and/or from an application (e.g., applications 702(1) and 702(2)) of the first and/or second device. The applications may be or may include an application executing on the respective first or second device. The applications may include an application, such as a web browser, video or audio streaming application, email application, a remote access application or any other application which can be configured to receive, process, and/or transmit data between the first device 302 and the second device 304 communicably coupled with one another. The first device 302 and the second device 304 may include one or more interfaces (e.g., interfaces 706(1), 706(2), 706(3), 706(4)). For example, at least one of the interfaces (e.g., INT1, INT2, INT3, INT4) of the UWB and/or non-UWB stacks may be or may include MAC layer management entities (MLME). For example, the MLMEs may be an interface or link between the MAC layers of the UWB and/or non-UWB stacks and the application layer of the first and second devices. The interfaces (e.g., the MLMEs or various other types of interfaces such as station management entities (SME)) may be configured to allow the application of each of the first and second device to control and/or receive data from the MAC layers and/or physical layers.

As depicted in FIG. 7 and described in greater detail herein, the second device 304 may be configured to receive UWB signals (e.g., from the first device 302) via the physical layer of the UWB stack, process the UWB signals, and/or transmit a measurement report corresponding to the received UWB signals via the physical layer of the non-UWB stack. Transmitting the measurement report via a non-UWB communication link may facilitate increasing efficiency and effectiveness of transmitting data between the first and second device as compared to transmitting the measurement report via the UWB stack, as the non-UWB communication link may be able to support a greater data transfer rate than the UWB antennas while maintaining the precision of UWB measurements.

Figure 8:
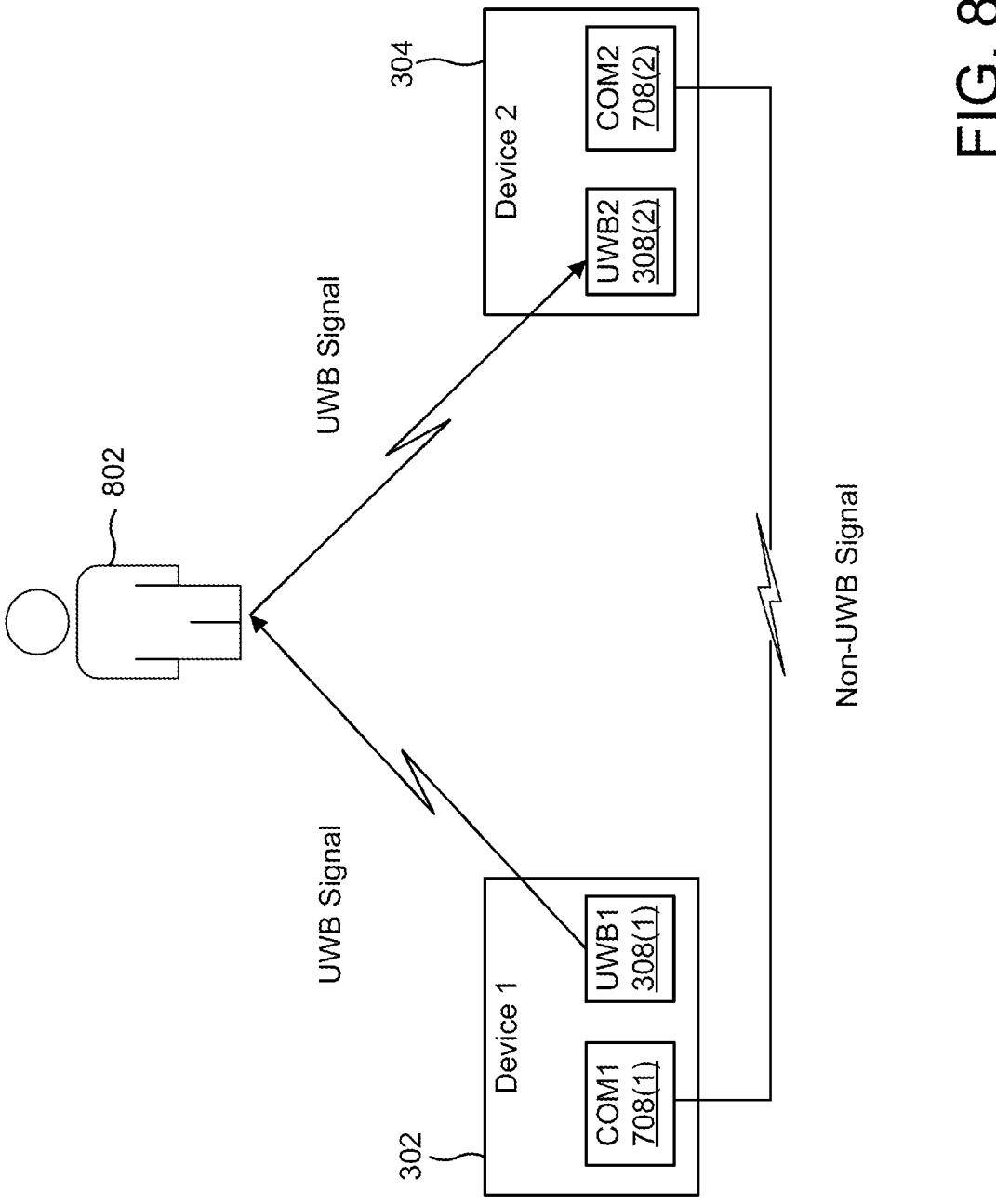
FIG. 8 is a block diagram of data communication between UWB devices within an environment, according to an example implementation of the present disclosure.

FIG. 8 is a block diagram of an environment 800 including the first device 302, the second device 304, and a target 802. The target 802 may be or may include any object that can reflect one or more UWB signals. For example, the object can include a person, device, portion of a landscape, and/or various other objects.

Referring to FIGS. 7 and 8, the first device 302 may be configured to transmit one or more UWB signals towards the target 802 via the physical layer of the UWB stack of the first device 302 (e.g., via the UWB antenna 308(1)). For example, in some embodiments, the application 702(1) of the first device 302 may be configured to generate a request for sensing measurements regarding the target 802 to determine that includes information about a position and/or movement of the target 802. In some embodiments, the application 702(1) of the first device 302 may be configured to request a measurement report to be sent from the second device 304 regarding the target 802. As described herein, the measurement report may include data indicating a distance (e.g., range, measurement, sensing value, etc.) between the first device 302 and the target 802, the second device 304 and the target 802, and/or various other information regarding the movement/positioning of the target 802. The application 702(1) may be configured to cause the first device 302 to transmit one or more UWB signals via the UWB antenna 308(1) towards the target 802 responsive to the generated request.

Before, during, and/or after the first device 302 transmits a UWB signal towards the target 802, the first device 302 and/or the second device 304 may be configured to cause (e.g., configure, request, signal) the second device 304 to use a non-UWB communication link for sending the measurement report between the first device 302 and the second device 304. In some embodiments, the first device 302 and/or the second device 304 may negotiate with the second device 304 to use a non-UWB communication link to transmit the measurement report during a handshake and/or link negotiation process. For example, the first device 302 may be configured to exchange handshake packet(s) with the second device 304 via the non-UWB stack or the UWB stack. The first device 302 may be configured to declare, establish, negotiate, or otherwise set a non-UWB communication link as a mode for transmitting data (e.g., the measurement report) from the second device 304 to the first device 302. For example, the first device 302 may be configured to determine to receive the measurement report via the non-UWB stack of the first device 302 (e.g., via the non-UWB communication device 708(1)).

In some embodiments, the first device 302 may be configured to indicate to the second device 304 to use a non-UWB communication link via a UWB signal. For example, at least one UWB signal transmitted from the first device 302 may be or may include a physical layer protocol data unit (PPDU). The PPDU may be or may include a data packet containing various data elements. The PPDU may include one or more frames and/or headers. For example, the PPDU may include a frame defining a preamble, a header, a body, and/or various other components. The header and/or frame of the PPDU may include a data indicating that the sensing measurements (e.g., in the measurement report) are not to be sent using a UWB communication link. For example, the header and/or frame of the PPDU may include a field within the data packet that can be extracted by the second device 304 and that indicates that a non-UWB communication link is to be used for sending the measurement report. In some embodiments, the first device 302 may be configured to transmit one or more PPDUs structured in pseudo-random sequences that may or may not include data regarding communication of the measurement report. In such instances, the second device 302(1) may be configured to determine to transmit the measurement report via the non-UWB communication link based on a configuration of the first device 302 and/or the second device 302(1) (e.g., established during a handshake or negotiation process).

The first device 302 may be configured to transmit UWB signals towards the target 802, to facilitate determining information about the movement and/or positioning of the target 802. In some embodiments, the first device 302 may be configured to transmit one or more UWB signals via the UWB antenna 308(1) based on one or more operational parameters. For example, the application 702(1) of the first device 302 may be configured to transmit data to the MAC layer and/or the physical layer of the UWB stack of the first device 302 to define and set up operational parameters for the PHY and MAC layers. The operational parameters may include, but are not limited to, identifiers (ID) or range of identifiers, tokens, time stamps, timing intervals of the UWB signals, PPDU type of the UWB signals, angle of the UWB signals, and/or phase or bandwidths of the UWB signals. For example, in some embodiments, the first device 302 (e.g., via the physical layer of the UWB stack) may be configured to transmit a UWB signal at a predetermined phase and/or angle relative to the target 802 or the second device 304. In some embodiments, the first device 302 may be configured to transmit a plurality of UWB signals at one or more predetermined phases and/or angles relative to the target 802 and/or another object. In some embodiments, the first device 302 may be configured to transmit the one or more UWB signals at random phases and/or angles. In some embodiments, the first device 302 may be configured to transmit one or more UWB signals while positioned at a predetermined distance from the second device 304 (e.g., the first device 302 may be configured to transmit and/or receive UWB signals to or from the second device 304 to determine a range between the first device 302 and the second device 304). In some embodiments, the first device 302 may be configured to transmit a data packet defining the predetermined operational parameters to the second device 304 via the UWB antennas (e.g., 308(1) and 308(2)) or via the non-UWB communication devices (e.g., 708(1) and 708(2)).

The second device 304 may be configured to detect one or more UWB signals from the first device 302 via the UWB antenna 308(2) of the second device 304. For example, the UWB antenna 308(2) of the second device 304 may detect the one or more transmitted UWB signals from the first device 302 that have reflected off the target 802, as depicted in FIG. 8. The one or more UWB signals may indicate a range, sensing measurement, and/or distance of the target 802 relative to the first device 302 and/or the second device 304. For example, the second device 304 may be configured to determine information about movement (e.g., velocity, acceleration, etc.) and/or a positioning (e.g., range) of the target 802 based on a TOF of the UWB signals between the first device 302, the second device 304, and/or the target 802. In some embodiments, the second device 304 may be configured to detect, via the UWB antenna 308(2), a plurality of UWB signals reflected off the target 802(e.g., off one or more portions of the target 802) to determine information about movement and/or a position of the target 802. In some embodiments, the second device 304 may be configured to detect one or more UWB signals reflected off the target 802 and one or more UWB signals reflected off another object within the environment 800 that is separate from the target 802. In these and in other embodiments, the second device 304 may be configured to detect a phase angle and/or phase difference between the reflected signals to facilitate determining the TOF of the UWB signals and/or the movement and/or the positioning of the target 802 relative to the first or second device.

By way of example, the first device 302 may be configured to transmit a plurality of UWB signals in various directions relative to a target 802 (e.g., a person). A first UWB signal may reflect off a first portion of the target 802 (e.g., off an upper body part of the person) and a second UWB signal may reflect off a second portion of the target 802 (e.g., off a lower body part of the person). A third UWB signal may miss the target 802 partially or entirely and reflect off another object in the environment 800, such as a wall. The physical layer (e.g., UWB antenna 308(2)) of the second device 304 may be configured to detect each of the first, second, and third signals simultaneously or at different times. The physical layer of the UWB stack of the second device 304 may be configured to determine information about movement and/or a position of the person relative to the second device 304 and/or the first device 302 based on the reflected signals (e.g., by determining a TOF based on time intervals of the detected signals, by detecting a phase angle and/or phase difference between the reflected signals, etc.). This example is non-limiting and for illustrative purposes. The target 802 can include one or more additional and/or alternative objects (e.g., a device, wall, tree, etc.) and the second device 304 can detect movement and/or a position of the target 802 in various additional and/or other ways.

Once the UWB signals are detected, the second device 304 may be configured to communicate (e.g., transmit) the data (e.g., measurements) determined based on the UWB signals and detected via the physical layer of the UWB stack to the MAC layer of the UWB stack. The second device 304 may be configured to transmit the data from the MAC layer of the UWB stack to the application layer (e.g., the application 702(2)) of the second device 304 via the MLME/interface 706(3) of the UWB stack. The application 702(2) of the second device 304 may be configured to process the data and generate a measurement report based on the data. In some embodiments, the application 702(2) of the second device 304 may be configured to maintain the data in the received format (e.g., not change the raw data when generating the measurement report). For example, if the physical layer of the UWB stack detects a signal (e.g., via the physical antenna) corresponding to the UWB signal from the first device 302, the application 702(2) may be configured to maintain the data (such as a voltage table mapping voltages of the signal detected via the physical antenna to distances) which the application 702(2) uses to generate the measurement report including the measurements (e.g., distance, range, angle of arrival, and/or other data included in the measurement report).

In some embodiments, the application 702(2) may be configured to process the data to generate the measurement report in a different format. For example, the application 702(2) may be configured to parse the received data of the UWB signals and can extract the data to generate the measurement report in a specific format (e.g., as text, as a number, as a map such as a range-Doppler map, etc.). For example, the application 702(2) may be configured to receive the data as one or more voltage measurements from the physical layer, extract or otherwise determine a numerical measurement based on the voltage measurement, and/or generate the measurement report in a specified format (e.g., a conversion of the numerical measurement to a distance measurement, an angular measurement, and so forth). In some embodiments, the PPDU received by the physical layer of the UWB stack may include a data element indicating the specified formatting of the measurement report. For example, the application 702(2) of the second device 304 may be configured to parse one or more PPDUs received by the physical layer of the UWB stack and extract a data element corresponding to a measurement report formatting type from one or more portions of the PPDU (e.g., the frame) to determine the desired format. In some embodiments, the application 702(2) may be configured to determine the measurement report format type during a handshake process (e.g., by extracting information from a handshake packet). In some embodiments, the application 702(2) may be configured to maintain, embed, or otherwise include an ID, a token, and/or a timestamp with the measurement report to indicate to the first device 302 that the measurement report corresponds to the received UWB signals.

The application layer of the second device 304 may be configured to transmit the generated measurement report to the MAC layer of the non-UWB stack of the second device 304 via an MLME/interface 706(4) of the non-UWB stack. For example, the application layer of the second device 304 may be configured to transmit the generated measurement report responsive to the application 702(2) determining (e.g., detecting) an indication to transmit the measurement report to the first device 302 via a non-UWB communication channel, as described herein. The application layer, or another layer, of the non-UWB stack of the second device may be configured to cause the MAC layer to transmit the measurement report to the physical layer of the non-UWB stack. The physical layer may be configured to transmit the measurement report via a non-UWB communication channel (e.g., via the non-UWB communication device 708(2)). As described herein, the non-UWB communication channel may include, but is not limited to, one or more links established and used to transmit communications sent via wireless communication protocols (e.g., a Wi-Fi protocol, a wireless local area network (WLAN) protocol, a cellular protocol, an internet protocol, a ZigBee protocol, or a Bluetooth™ wireless protocol) and/or one or more wired lines (e.g., Ethernet, USB, Thunderbolt). In some embodiments, the second device 304 may be configured to transmit and upload the measurement report to a database (e.g., a remote storage service, one or more third party data stores, and/or other cloud services) for the first device 302 to retrieve.

The first device 302 may be configured to receive the measurement report corresponding to the transmitted UWB signals via the non-UWB communication channel from the second device 304. For example, the physical layer of the non-UWB stack of the first device 302 may detect and receive the measurement report transmitted via the physical layer of the non-UWB stack of the second device 304. The physical layer of the non-UWB stack of the first device 302 may be configured to transmit the measurement report to the MAC layer of the non-UWB stack of the first device 302, which in turn transmits the measurement report to the application layer of the first device 302 via an MLME/interface 706(1) of the non-UWB stack of the first device 302. In some embodiments, the first device 302 may be configured to receive (e.g., retrieve, pull) the measurement report from a database (e.g., the Cloud). The application layer of the first device 302 may be configured to process the measurement report to complete the initial request of the first device 302. For example, the application 702(1) of the first device 302 may be configured to extract one or more identifiers of the measurement report to match the measurement report with the initial request (e.g., match one or more parameters of the measurement report with one or more of the operational parameters of the initial request, such as an ID, a token, and/or a time stamp).

In some embodiments, the environment 700, 800 may include a third device. The third device may be configured similar to the first device 302 and/or the second device 304. The third device may be configured to communicably couple to the first device 302 in the various ways described herein. In these embodiments, the third device may be configured to detect one or more UWB signals reflected off the target 802 and/or from another portion of the environment in addition to the second device 304. The third device may be configured to transmit the detected UWB signal data from a physical layer of a UWB stack of the third device to a MAC layer and to an application layer via an MLME/interface of the UWB stack. The application layer of the third device may be configured to process the data (e.g., similar to the application 702(2) of the second device 304) and transmit a generated measurement report from the application layer to a MAC layer of a non-UWB stack (e.g., via a second MLME/interface), to a physical layer of the non-UWB stack, and to the first device 302 via a non-UWB communication channel between the first device 302 and the third device. In these embodiments, the first device 302 may be configured to receive multiple measurement reports from two distinct devices and/or locations (e.g., from the second device 304 and the third device), which may facilitate increasing an accuracy and/or efficiency of determining information about movement and/or positioning of the target.

In some embodiments, one or more devices within the environment 700, 800 (e.g., the first device 302, second device 304, third device, or other device) may be a proxy initiator that may be configured to request another device (e.g., a proxy responder) within the environment to obtain a measurement report by proxy. By way of example, the third device in the environment may be configured as a proxy initiator. The third device may be configured to communicably couple to the first device 302 in various ways described herein. The third device may be configured to request the first device 302 to obtain a measurement report from the second device 304. Once the first device 302 has received the measurement report from the second device 304, the third device may be configured to request the first device 302 to transmit the measurement report to the third device.

Referring now to FIG. 9, depicted is a flowchart showing an example method 900 of sensing a target between two devices, according to an illustrative embodiment. The method 900 may be performed by the first device 302 and the second device 304 described with reference to FIGS. 7 and 8. As a brief overview, at step 902, the first device 302 may transmit one or more UWB signals towards a target 802 via a UWB antenna 308(1). At step 904, the second device 304 may detect the one or more UWB signals reflected off the target 802 via a UWB antenna 308(2). At step 906, the second device 304 may generate a measurement report corresponding to the one or more UWB signals. At step 908, the second device 304 may transmit the measurement report via a non-UWB communication device 708(2). At step 910, the first device 302 may receive the measurement report corresponding to the one or more UWB signals via a non-UWB communication device 708(1).

In greater detail, at step 902, the first device 302 may transmit one or more UWB signals via a UWB antenna 308(1). For example, as described herein, the first device 302 may include an ultra-wideband (UWB) stack including an application layer (e.g., application 702(1)), a media access control (MAC) layer (e.g., MAC2 704(2)), and a physical layer (e.g., UWB1 308(1)). The application layer may generate a request for a measurement report with respect to a target 802 within an environment 800. The application layer may transmit the request to the MAC layer via a first MAC layer management entity (MLME)/interface 706(2) of the first device 302. The MAC layer may receive the request, and transmit a signal to the physical layer to cause the physical layer (e.g., the UWB antenna 308(1)) to transmit the one or more UWB signals towards the target 802 in the environment 800. The first device 302 may transmit the one or more UWB signals in various directions such that at least one UWB signal can reflect off a portion of the target 802 to be detected by the second device 304. As described herein, the target 802 may be various objects that can reflect a signal. For example, the target 802 may be a person, object, device, and/or portion of a landscape/environment. In some embodiments, at least one UWB signal is structured as a physical layer protocol data unit (PPDU). For example, the PPDU may include a frame having a preamble, header, and/or body. In some embodiments, one or more portions of the PPDU (e.g., the frame, the header, or another portion) may include one or more data elements indicating that the measurement report is to be transmitted via a non-UWB communication link. In some embodiments, the PPDU may include one or more data elements indicating a formatting for the measurement report (e.g., raw data, numerical format, text format, or other output/format). In some embodiments, the PPDU may be or include a pseudo-random sequence, and may thus not include a payload or various data elements indicating a formatting for the measurement report. For example, the first device 302 may indicate to transmit the measurement report in a specific format during a handshake process with the second device 302(1), a negation process with the second device 302(1), and/or in various other ways.

As described herein, the first device 302 may transmit the one or more UWB signals based on at least one predefined operational parameter. For example, the application 702(1) of the first device 302 may define and establish operational parameters for the physical and MAC layers. The operational parameters may include, but are not limited to, identifiers (ID) or range of identifiers, tokens, timestamps, timing intervals of the UWB signals, PPDU type of the UWB signals, angle of the UWB signals, and/or phase or bandwidths of the UWB signals. For example, in some embodiments, the first device 302 (e.g., via the physical layer of the UWB stack) may transmit a UWB signal at a predetermined phase and/or angle relative to the target 802 or the second device 304. In some embodiments, the first device 302 may transmit a plurality of UWB signals at one or more predetermined phases and/or angles relative to the target 802 and/or another object. In some embodiments, the first device 302 may transmit the one or more UWB signals at random phases and/or angles. In some embodiments, the first device 302 may transmit one or more UWB signals while positioned at a predetermined distance from the second device 304 (e.g., the first device 302 may transmit and/or receive UWB signals to or from the second device 304 to determine a range between the first device 302 and the second device 304). In some embodiments, the first device 302 may transmit a data packet defining the predetermined operational parameters to the second device 304 via the UWB antennas (e.g., 308(1) and 308(2)) or via the non-UWB communication devices (e.g., 708(1) and 708(2)).

In some embodiments, the first device 302 may negotiate with the second device 304 to establish, maintain, identify, or otherwise determine a non-UWB communication link with the second device 304 with which to communicate measurement reports. In some embodiments, the first device 302 may establish a non-UWB communication link with the second device 304 during a handshake process. For example, the first device 302 may exchange handshake packet(s) with the second device 304 via the UWB stack (or a non-UWB stack including a non-UWB communication device 708(1)) for negotiating or otherwise determining the non-UWB communication link. The first device 302 may declare a non-UWB communication link as a mode for transmitting the measurement report from the second device 304 to the first device 302. For example, the first device 302 may expect to receive the measurement report via the non-UWB stack of the first device 302 (e.g., via the non-UWB communication device 708(1)).

At step 904, the second device 304 may detect the one or more UWB signals via a UWB antenna 308(2) of the second device 304. For example, the second device 304 may detect the UWB signals structured as a PPDU and reflected off the target 802 in the environment 800. As described herein, the UWB antenna 308(2) of the second device 304 may form at least a portion of a physical layer of a UWB stack of the second device 304. The UWB stack of the second device 304 may include the physical layer, a MAC layer (e.g., MAC3 704(3)), and an application layer (e.g., application 702(2)). The physical layer of the UWB stack may communicate the received data (e.g., from the first device 302) to the application layer of the second device 304. For example, the physical layer of the UWB stack may communicate the received data to the application 702(2) by communicating the data through the MAC layer of the UWB stack and via an MLME/interface 706(3) of the UWB stack. The one or more UWB signals may indicate a range, sensing measurement, and/or distance of the target 802 relative to the first device 302 and/or the second device 304. For example, the second device 304 may determine information about movement (e.g., velocity, acceleration, etc.) and/or a positioning (e.g., range) of the target 802 based on a TOF of the UWB signals between the first device 302, the second device 304, and/or the target 802. In some embodiments, the second device 304 may detect, via the UWB antenna 308(2), a plurality of UWB signals reflected off the target 802 (e.g., off one or more portions of the target 802) to determine information about movement and/or a position of the target 802. In some embodiments, the second device 304 may detect one or more UWB signals reflected off the target 802 and one or more UWB signals reflected off another object within the environment 800 that is separate from the target 802. In these and in other embodiments, the second device 304 may detect a phase angle and/or phase difference between the reflected signals to facilitate determining the TOF of the UWB signals and/or movement and/or the positioning of the target 802 relative to the first or second device.

At step 906, the second device 304 may generate a measurement report corresponding to the received UWB signals from the first device 302. For example, the application 702(2) of the second device 304 may process the received data (e.g., the PPDU) and may generate a measurement report. The measurement report may indicate a movement and/or position element of the target 802. In some embodiments, the application 702(2) may generate the measurement report that includes the raw data received by the physical layer of the second device 304 (e.g., a voltage measurement, a range measurement, a UWB measurement relating to the target 802, etc.). In some embodiments, the application 702(2) may generate the measurement report in a format that differs from the received UWB signals. For example, the application 702(2) may parse the PPDU for one or more data elements defining a format and/or generate the measurement report structured as a range-Doppler map, a textual output, a numerical output, or other format. As another example, the application 702(2) may determine a format of the measurement report during a handshake and/or negotiation process with the first device 302.

At step 908, the second device 304 may transmit the generated measurement report via a non-UWB communication device 708(2). For example, in some embodiments, the application 702(2) of the second device 304 may parse the received UWB signals (e.g., PPDU) and can extract a data element indicating that the measurement report is to be transmitted via a non-UWB communication link. In some embodiments, the first device 302 and the second device 304 may establish the non-UWB communication link during a negotiation process and/or a handshake process. Responsive to determining that the measurement report is to be transmitted via a non-UWB communication link, the application 702(2) of the second device 304 may communicate the measurement report to a MAC layer (e.g., MAC4 704(4)) of a non-UWB stack of the second device 304 via an MLME/interface 706(4) of the non-UWB stack of the second device 304. The MAC layer of the non-UWB stack may communicate the measurement report to a physical layer of the non-UWB stack. For example, the physical layer of the non-UWB stack may include a non-UWB communication device 708(2), such as a non-UWB antenna. The non-UWB communication device 708(2) may communicate the measurement report to the first device 302 on a wireless link or channel via a wireless protocol including, but not limited to, a wireless local area network (WLAN) protocol, a cellular protocol, or a Bluetooth™ protocol, or via one or more wired links including, but not limited to, an Ethernet, co-axial, USB, or Thunderbolt. In some embodiments, the second device 304 may transmit and may upload the measurement report to a database (e.g., cloud services) for the first device 302 to retrieve.

At step 910, the first device 302 may receive the measurement report from the second device 304. For example, a physical layer (e.g., non-UWB communication device 708(1)) of a non-UWB stack of the first device 302 may receive the measurement report via the non-UWB communication link between the non-UWB communication device 708(1) of the first device 302 and the non-UWB communication device 708(2) of the second device 304. In some embodiments, the first device 302 may receive (e.g., retrieve, pull) the measurement report from a database (e.g., the Cloud). The physical layer of the non-UWB stack may communicate the measurement report to a MAC layer (e.g., MAC1 704(1)) of the non-UWB stack. The MAC layer may communicate the measurement report to the application layer of the first device 302 via a second MLME/interface 706(1) of the first device 302. The application layer of the first device 302 may parse the received measurement report and extract one or more identifiers to identify that the measurement report corresponds to the transmitted UWB signals. For example, the application layer may identify one or more identifiers corresponding to the operational parameters of the transmitted UWB signals (e.g., identifiers (ID), tokens, time stamps, timing intervals of the UWB signals, PPDU type of the UWB signals, angle of the UWB signals, and/or phase or bandwidths of the UWB signals). The application layer may determine, based on the identifiers, that the measurement report corresponds to the transmitted UWB signals associated with the generated request to complete the request.

In some embodiments, the environment 800 may include a third device. The third device may communicably couple to the first device 302 in the various ways described herein. In these embodiments, the third device may additionally detect one or more UWB signals reflected off the target 802 and/or from another portion of the environment. The third device may transmit the detect UWB signal data from a physical layer of a UWB stack of the third device to a MAC layer and to an application layer via an MLME/interface of the UWB stack. The application layer of the third device may process the data (e.g., similar to the application 702(2) of the second device 304) and transmit a generated measurement report from the application layer to a MAC layer of a non-UWB stack (e.g., via a second MLME/interface), to a physical layer of the non-UWB stack, and to the first device 302 via a non-UWB communication channel between the first device 302 and the third device. In these embodiments, the first device 302 may receive multiple measurement reports from two distinct devices and/or locations (e.g., from the second device 304 and the third device), which may facilitate increasing an accuracy and/or efficiency of determining information about the movement and/or positioning of the target.

In some embodiments, one or more devices within the environment 700, 800 (e.g., the first device 302, second device 304, third device, or other device) may be a proxy initiator that may request another device (e.g., a proxy responder) within the environment to obtain a measurement report by proxy. By way of example, the third device in the environment may be a proxy initiator. The third device may communicably couple to the first device 302 in various ways described herein. The third device may request the first device 302 to obtain a measurement report from the second device 304. As such, and in this example, step 902 may be performed responsive to the third device requesting the first device 302 to obtain the measurement report. Once the first device 302 has received the measurement report from the second device 304, the third device may request the first device 302 to transmit the measurement report to the third device.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
detecting, by a first device, a ultra-wideband (UWB) signal, comprising a physical layer protocol data unit (PPDU), received from a second device via a UWB antenna of the first device, the PPDU including a communication parameter;
communicating, from a physical layer of the first device through a medium access control (MAC) layer to an application of the first device, measurement data corresponding to the UWB signal;
generating, by the first device, a measurement report corresponding to the UWB signal;
determining, by the first device, based on the communication parameter, a transmission mode for the measurement report; and
transmitting, by the first device, based on the determined transmission mode, the measurement report to the second device via a non-UWB communication device of the first device.

2. The method of claim 1, further comprising configuring, by the first device with the second device, to use a non-UWB communication link for sending measurement reports corresponding to UWB signals between the first device and the second device.

3. The method of claim 1, wherein the measurement data is communicated from the physical layer via an interface to the application.

4. The method of claim 3, wherein the interface is a first interface, the method further comprising:
communicating the measurement report via a second interface to the non-UWB communication device for transmission to the second device.

5. The method of claim 3, wherein the interface comprises a medium access control (MAC) layer management entity (MLME) between a MAC layer and the application.

6. The method of claim 1, wherein the non-UWB communication device transmits the measurement report via a protocol comprising at least one of a wireless local area network (WLAN) protocol, cellular protocol, Bluetooth wireless protocol, or non-wireless protocol.

7. A first device comprising:
an ultra-wideband (UWB) antenna;
a non-UWB communication device; and
one or more processors configured to:
detect a UWB signal, comprising a physical layer protocol data unit (PPDU), received from a second device via the UWB antenna, the PPDU including a communication parameter;
communicate, from a physical layer of the first device through a medium access control (MAC) layer to an application of the first device, measurement data corresponding to the UWB signal;
generate a measurement report corresponding to the UWB signal;
determine, based on the communication parameter, a transmission mode for the measurement report; and
transmit the measurement report to the second device via the non-UWB communication device based on the determined transmission mode.

8. The first device of claim 7, wherein the measurement data is communicated from the physical layer via an interface to the application.

9. The first device of claim 8, wherein the interface is a first interface, and wherein the application is configured to communicate the measurement report via a second interface to the non-UWB communication device for transmission to the second device.

10. The first device of claim 7, wherein the non-UWB communication device transmits the measurement report via a protocol comprising at least one of a wireless local area network (WLAN) protocol, cellular protocol, Bluetooth wireless protocol, or non-wireless protocol.

11. The first device of claim 7, wherein the one or more processors are configured to:

use a non-UWB communication link for sending measurement reports corresponding to UWB signals between the first device and the second device.

\* \* \* \* \*